(12) United States Patent
Diani et al.

(10) Patent No.: US 8,689,655 B2
(45) Date of Patent: Apr. 8, 2014

(54) MULTI-SPEED TRANSMISSION

(75) Inventors: Roberto Diani, Modena (IT); Paolo Neri, Campogalliano (IT); Fabio Belletti, Malalbergo (IT)

(73) Assignee: Automobili Lamborghini S.p.A., Sant' Agata Bolognese (BU) (IT)

( * ) Notice: Subject to any disclaimer, the term of this patent is extended or adjusted under 35 U.S.C. 154(b) by 0 days.

(21) Appl. No.: 13/817,347

(22) PCT Filed: Aug. 17, 2011

(86) PCT No.: PCT/IB2011/053633
§ 371 (c)(1),
(2), (4) Date: Feb. 28, 2013

(87) PCT Pub. No.: WO2012/023110
PCT Pub. Date: Feb. 23, 2012

(65) Prior Publication Data
US 2013/0205946 A1      Aug. 15, 2013

(30) Foreign Application Priority Data
Aug. 17, 2010   (IT) .............................. MI2010A1557

(51) Int. Cl.
*F16H 3/08*    (2006.01)
(52) U.S. Cl.
USPC .............................................. 74/333; 74/329
(58) Field of Classification Search
USPC .......................... 74/325, 329, 330, 331, 340
See application file for complete search history.

(56) References Cited

U.S. PATENT DOCUMENTS

| | | | |
|---|---|---|---|
| 3,354,745 A | 11/1967 | de Coye de Castelet | |
| 5,335,562 A * | 8/1994 | Mastroianni et al. | ........... 74/329 |
| 5,404,772 A | 4/1995 | Jester | |
| 6,948,394 B2 * | 9/2005 | Ikeda | .............................. 74/331 |
| 7,125,362 B2 * | 10/2006 | Beaty et al. | ........................ 477/3 |
| 7,231,843 B2 * | 6/2007 | Gumpoltsberger et al. | .... 74/329 |
| 7,255,018 B2 * | 8/2007 | Gumpoltsberger | ............. 74/331 |
| 7,311,015 B2 * | 12/2007 | Kluge | .......................... 74/337.5 |

(Continued)

FOREIGN PATENT DOCUMENTS

| | | |
|---|---|---|
| DE | 102006001727 | 4/2007 |
| DE | 102008051296 | 4/2010 |

(Continued)

OTHER PUBLICATIONS

International Search Report issued by the European Patent Office in International Application No. PCT/IB2011/053633.

*Primary Examiner* — Ha D Ho
*Assistant Examiner* — Jude Agendia
(74) *Attorney, Agent, or Firm* — Henry M. Feiereisen LLC (57) ABSTRACT

A multi-speed transmission for a motor vehicle, in particular for a sports car, has several forward speeds and a reverse speed, an input or primary shaft, a first output or secondary shaft for driving a first drive shaft leading to an axle differential, and a second output shaft or tertiary shaft for driving a second drive shaft leading to another axle differential. The first output or secondary shaft and the second output or tertiary shaft carry two meshing fixed gears. The fixed gear on the first output or secondary shaft meshes with an idle gear on the input or primary shaft. In one of the forward speeds the idle gear coupled in a rotationally restrained manner with the input or primary shaft directly drives the fixed gear on the first output or secondary shaft.

44 Claims, 4 Drawing Sheets

(56) References Cited

U.S. PATENT DOCUMENTS

| | | | |
|---|---|---|---|
| 7,313,981 B2 * | 1/2008 | Gumpoltsberger | 74/340 |
| 7,430,935 B2 | 10/2008 | Ohnemus | 74/329 |
| 7,437,963 B2 * | 10/2008 | Haka et al. | 74/329 |
| 7,469,609 B2 * | 12/2008 | Baldwin | 74/330 |
| 7,500,411 B2 * | 3/2009 | Gumpoltsberger | 74/329 |
| 7,886,626 B2 * | 2/2011 | Bjorck et al. | 74/330 |
| 8,011,261 B2 * | 9/2011 | Diemer et al. | 74/330 |
| 8,117,932 B2 * | 2/2012 | Bjorck et al. | 74/329 |
| 8,438,941 B2 * | 5/2013 | Mellet et al. | 74/330 |
| 8,534,150 B2 * | 9/2013 | Mellet et al. | 74/331 |
| 2005/0061093 A1 | 3/2005 | Tsberger | |
| 2005/0166693 A1 * | 8/2005 | Lauri et al. | 74/325 |
| 2005/0252325 A1 * | 11/2005 | Stevenson | 74/325 |
| 2006/0101932 A1 * | 5/2006 | McCrary | 74/329 |
| 2011/0067512 A1 * | 3/2011 | Kang et al. | 74/330 |
| 2012/0260756 A1 * | 10/2012 | Mellet et al. | 74/331 |

FOREIGN PATENT DOCUMENTS

| | | |
|---|---|---|
| EP | 1 580 456 | 9/2005 |
| JP | 2009-523972 | 6/2009 |
| WO | WO 2007/087855 | 8/2007 |

* cited by examiner

MULTI-SPEED TRANSMISSION

CROSS-REFERENCES TO RELATED APPLICATIONS

This application is the U.S. National Stage of International Application No. PCT/IB2011/053633, filed Aug. 17, 2011, which designated the United States and has been published as International Publication No. WO 2012/023110 and which claims the priority of Italian Patent Application, Ser. No. MI2010A001557, filed Aug. 17, 2010, pursuant to 35 U.S.C. 119(a)-(d).

BACKGROUND OF THE INVENTION

The invention relates to a multi-speed transmission for a motor vehicle, as well as a motor vehicle with such a multi-speed transmission. The invention in particular relates to an automated multi-speed transmission in which the engagement and the disengagement of the speeds are carried out electro-hydraulically.

There are often several needs when transmissions of this kind are mounted on sports car: first, the transmission, due to the limited available space, should have a relatively small constructional size. In particular, when the transmission is arranged in a two-seater sports car, in the forward direction, in front of a drive engine inserted in the tail of the sports car within a central tunnel extending forward between the seats of the sports car, the transversal size of the transmission should not be too big. Second, the number of the components of the transmission should be kept low not only for saving space but also for cost reasons. In sports car with two driven axles, these aims must further be satisfied in spite of the need of two separate drive shafts leading to the differentials of the front axle and of the rear axle.

SUMMARY OF THE INVENTION

Starting from this, the problem at the base of the invention is to provide a multi-speed transmission suitable for driving two axles which has a compact constructional design with small transversal dimensions and a low number of constructional parts.

This problem is solved according to the invention by multi-speed transmission having several forward speeds and a reverse speed, with an input or primary shaft, with a first output shaft or secondary shaft for driving a first drive shaft leading to an axle differential and with a second output shaft or tertiary shaft for driving a second drive shaft leading to another axle differential, wherein the first output or secondary shaft and the second output or tertiary shaft carry two meshing fixed gears, wherein the Fixed gear on the first output or secondary shaft meshes with an idle gear on the input or primary shaft, and wherein in one of the forward speeds the idle gear coupled in a rotationally restrained manner with the input or primary shaft directly drives the fixed gear on the first output or secondary shaft.

By means of the combination of features according to the invention, the fixed gear on the first output shaft or secondary shaft together with the idle gear on the input shaft or primary shaft can form a gear stage for one of the forward speeds of the transmission and at the same time, together with the fixed gear on the second output shaft or tertiary shaft, it can form the gear stage for driving the drive shaft leading to the other axle differential. Thus, a specific gear stage or at least a further gear for driving this drive shift can be saved on the second output shaft or tertiary shaft, which thus preferably does not carry any further gear other than the fixed gear.

A further preferred embodiment of the invention provides for driving the fixed gear on the first output shaft or secondary shaft in the third speed directly by means of the idle gear on the input shaft or primary shaft which in this speed is coupled in a rotationally restrained manner with the input shaft or primary shaft.

In order to decrease the constructional space of the transmission, the idle gear on the input shaft or primary shaft is preferably combined with an adjacent idle gear on the input shaft or primary shaft into a shift group. Within the frame of this patent application two speeds which are shifted by means of a common shift device are defined as a shift group, for which purpose its pairs of gears are arranged in a side-by-side position. Since two speeds share each a common shift device, the need of space of the transmission can be remarkably reduced.

Correspondingly, a further fixed gear meshing with the further idle gear on the input shaft or primary shaft and directly driven by the latter in another forward speed, preferably in the fifth speed, is arranged close to the fixed gear on the first output shaft or secondary shaft.

In order to further decrease the transversal dimensions of the transmission, the second output shaft or tertiary shaft is advantageously arranged aslant under the first output shaft or secondary shaft, which in turn is arranged aslant under the input shaft or primary shaft. According to a further preferred embodiment of the invention, each of the forward speeds and the reverse speed comprise a driving gear and a driven gear, one of which is arranged on the input shaft or primary shaft and the other is arranged on the first output shaft or secondary shaft. In this regard, one of the two gears of each speed is mounted as a fixed gear and the other as an idle gear on the corresponding shaft, wherein the idle gear for driving a shift device can be coupled in a rotationally restrained manner with the corresponding shaft. By arranging all the speeds on two shafts only, in particular the input shaft or primary shaft and the output shaft or secondary shaft, especially the transversal dimensions of the transmission can be kept very small.

In order to increase the rigidity of the system and to improve the stability during the working, both the input or primary shaft and the output or secondary shaft are each supported in three journal bearings, which are arranged close to a center and to two opposite front ends of the shafts. In order to make the installation of the central journal bearings easier, the gearbox is suitably divided along on a central dividing plane thereof into two casing parts arranged one behind the other in the axial direction.

The transmission is preferably an automatic transmission, the speeds of which are engaged in an electro-hydraulic way, preferably through four axially movable shift bars, each of which is firmly connected with the shift sleeve of one of the four shift groups and can be shifted inside the gearbox parallel to the rotation axes of the input or primary shaft and the output or secondary shaft with the aid of two hydraulic cylinders at the two opposite front ends of the shift bar. The hydraulic shifting of the shift bars is carried out with the aid of a hydraulic group, which is suitably flanged at the front end of the transmission opposite to the drive engine outside the gearbox and which is connected through hydraulic ducts with the hydraulic cylinders.

In case the multi-speed transmission, according to a further preferred embodiment of the invention, is a 7-speed transmission with seven forward speeds and a reverse speed, the eight speeds are suitably combined in pairs into four shift groups, of which two are arranged on the input or primary shaft and two on the first output or secondary shaft. By means of the division into pairs of the four shift groups on both shafts the need of space of the shift devices needed for shifting, as for example the shift bars, is reduces and therefore the dimensions of the gearbox can be further minimized.

Adjacent speeds are advantageously arranged in different shift groups at least between the first speed and the sixth speed, so that they can be driven at the same time or with a time intersection, since both shift processes, i.e. the disengagement of the already engaged speed and the engagement of the closest higher speed or the closest lower speed, due to this arrangement can be carried out with different shift devices which can be controlled separately. Thus, the speed changes can be completed in a very fast manner and almost without any interruption of the driving force, which makes a very sporty drive mode possible between the first and the sixth speed.

In the preferred 7-speed transmission a further preferred embodiment provides that the driving gears of the reverse speed, of the first speed, of the second speed and of the fourth speed are mounted in a rotationally restrained manner as fixed gears on the input or primary shaft, while the driving gears of the third speed, of the fifth speed, of the sixth speed and of the seventh speed are mounted as idle gears on the input or primary shaft. On the other hand, the driven gears of the reverse speed, of the first speed, of the second speed and of the fourth speed are mounted in a rotationally free manner as idle gears on the first output or secondary shaft, while the driven gears of the third speed, of the fifth speed, of the sixth speed and of the seventh speed are mounted as fixed gears on this shaft.

The transmission is suitably a shift sleeve transmission, in which the idle gears on the corresponding shaft are only rotatable, but they are not slidable in the axial direction, and in which the idle gears with the aid of shift devices in the form of shift sleeves are connected in a rotationally restrained manner with the corresponding shaft. In this regard, each shift group has a single shift sleeve, with which one of the two idle gears of the two speeds belonging to the shift group can be driven at choice, i.e. it can be engaged or disengaged.

The drive of the two front wheels in the motor vehicle according to the invention is preferably carried out through the first drive shaft lead from the gearbox to a front axle differential, the rear front end of the drive shaft being connected in a rotationally restrained manner with the front front end of the first output or secondary shaft. On the other hand, the drive of the two rear wheels of the motor vehicle is preferably carried out through the second drive shaft lead from the gearbox under the drive engine to a rear axle differential, the front front end of the drive shaft being connected in a rotationally restrained manner with the rear front end of the short second output shaft or tertiary shaft.

BRIEF DESCRIPTION OF THE DRAWING

The present invention is disclosed hereafter more in detail with reference to an exemplary embodiment shown in the drawing.

DETAILED DESCRIPTION OF PREFERRED EMBODIMENTS

The 7-speed transmission 1 illustrated in the drawing for a two-seater sports car is intended to be installed, in the forward direction, in front of a drive engine (not shown) inserted in the tail of the sports car, so that transmission 1 after the installation is arranged inside a central tunnel T (FIG. 5) of the sports car, which tunnel extends forwards through the driver and passenger compartment between the seats.

Transmission 1 has a gearbox 2 divided into two parts in the forward direction of the motor vehicle with a front casing part 3 and a rear casing part 4, which are mutually connected in a separable manner along a dividing plane 5. The rear casing part 4 is provided at its front end facing the drive engine with a flanged clutch 6 constructed as a dual disk clutch, while the front casing portion 3 at its front end opposite to the drive engine is provided with a hydraulic group 7 of an electro-hydraulic gear shift.

Figure 1:
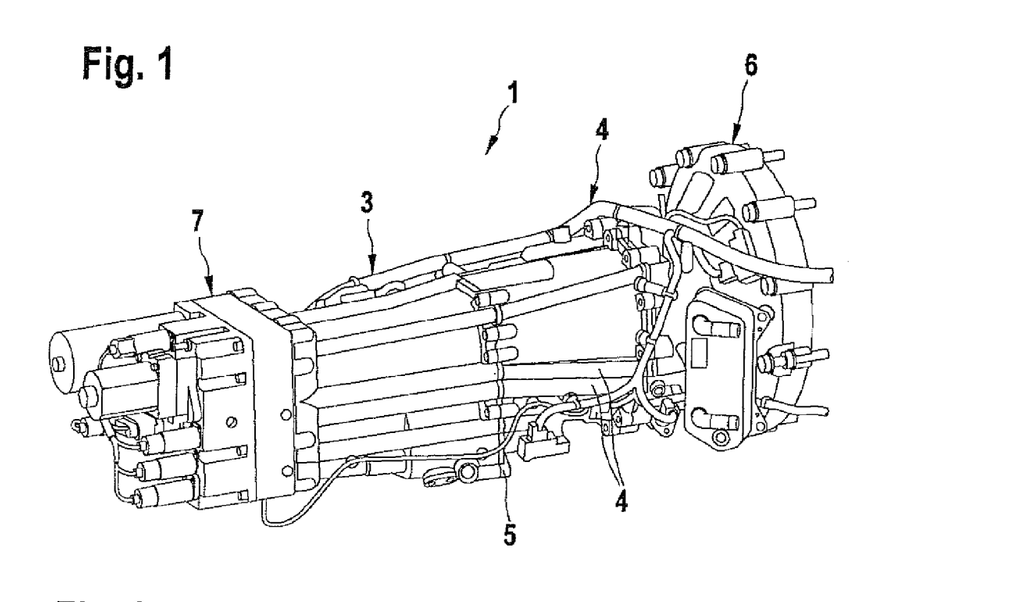
FIG. 1 shows a perspective view of a transmission according to the invention constructed as a shift sleeve transmission.
Figure 2:
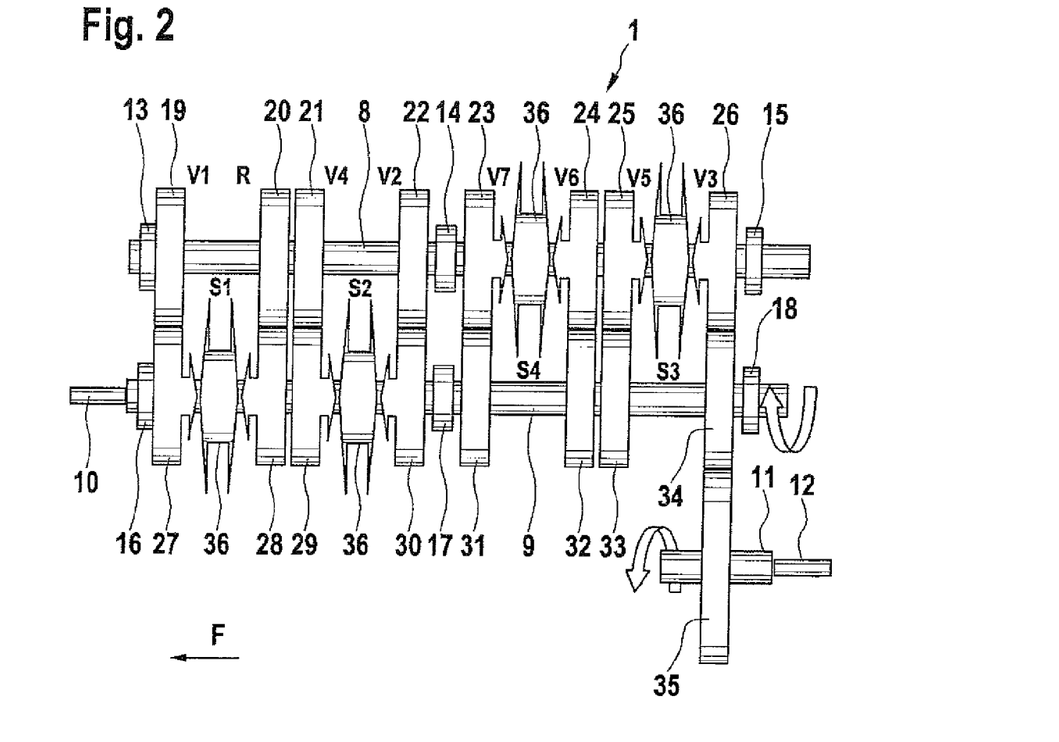
FIG. 2 shows a schematic view of shafts, gears and shift sleeves of the transmission.
Figure 3:
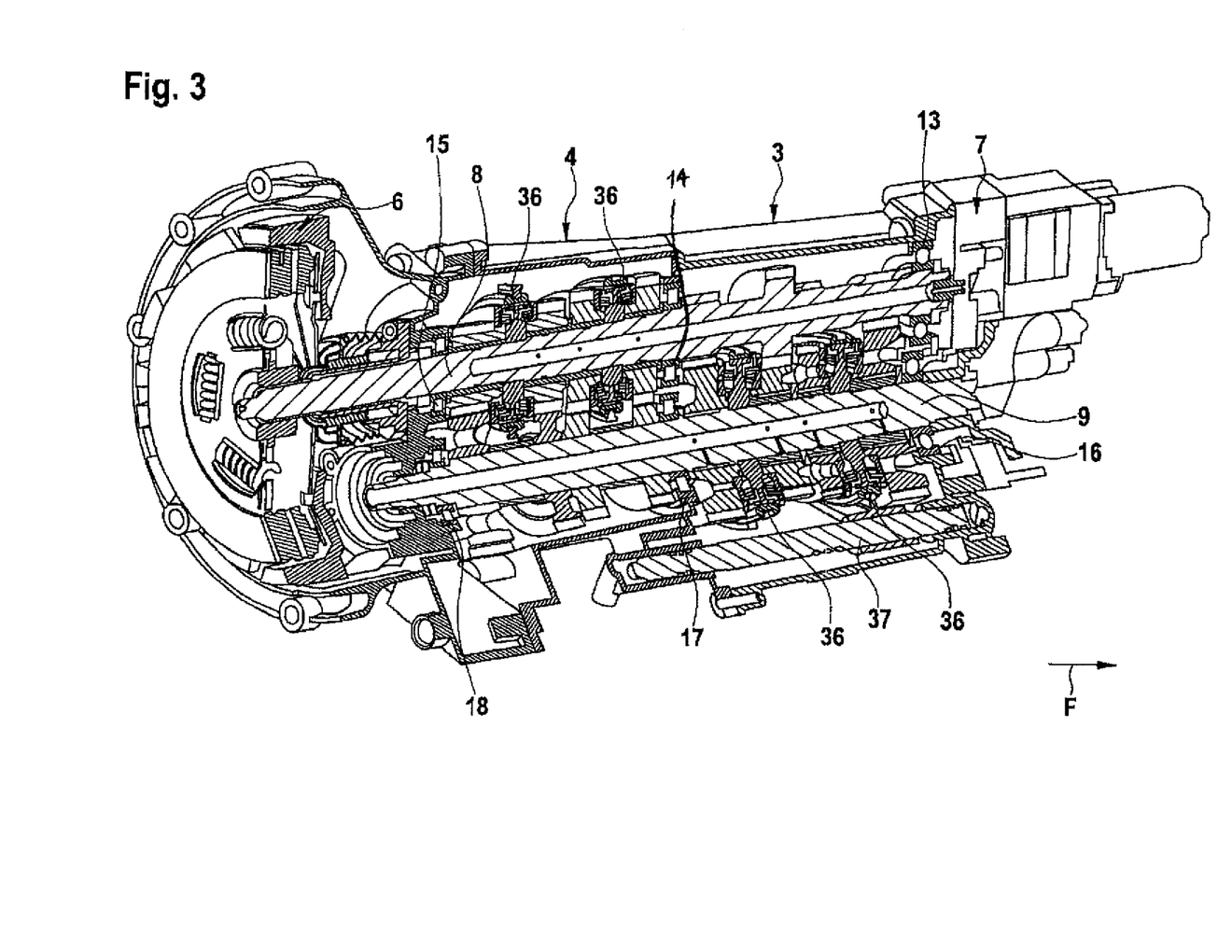
FIG. 3 shows a partially cutaway perspective view of the transmission, however from a point of view opposite to FIG. 1.
Figure 5:
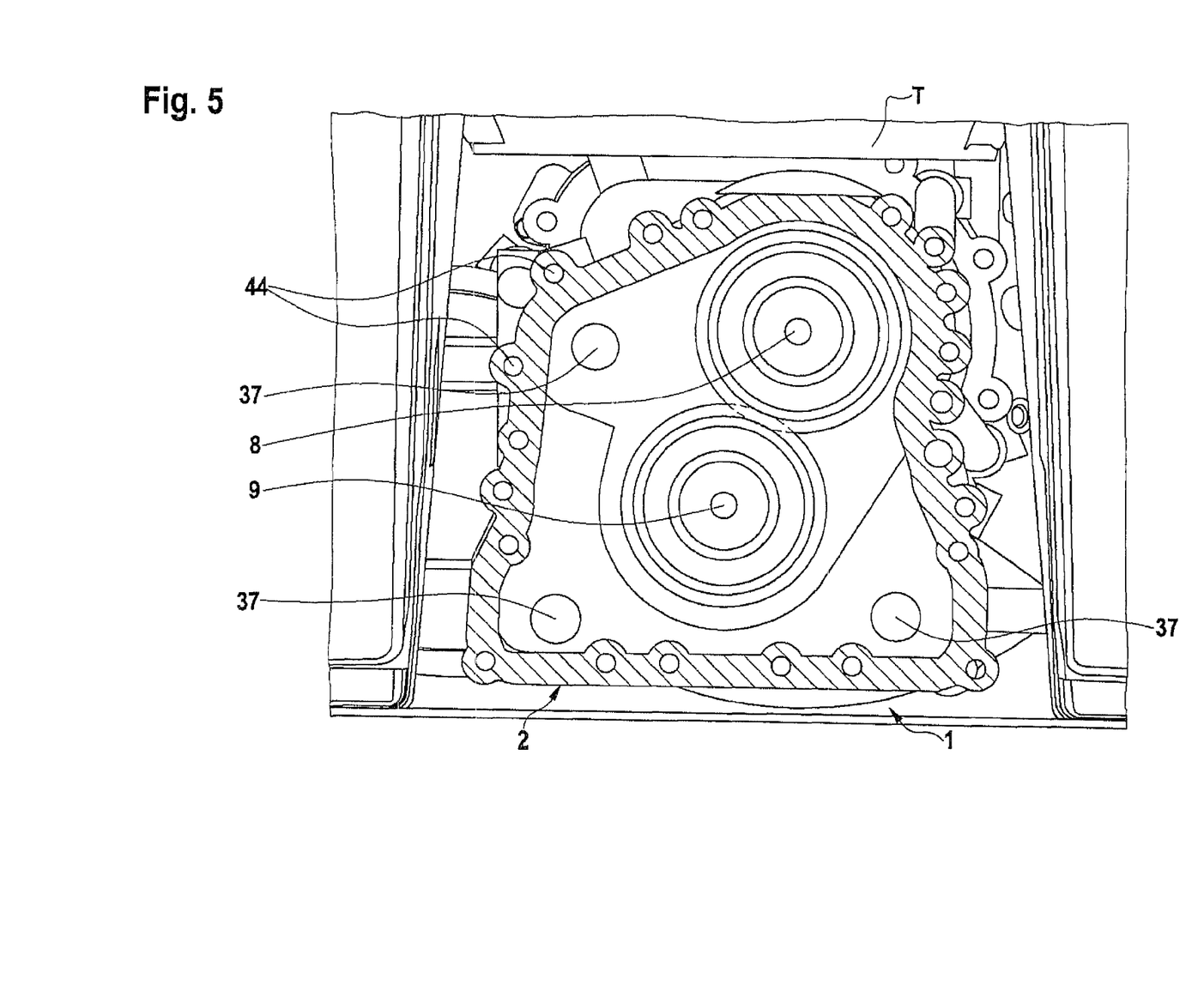
FIG. 5 shows a cross-sectioned view of the transmission.

As shown in the best way in FIGS. 2 and 3, two shafts extending substantially on the whole length of transmission 1 are arranged inside gearbox 2, namely an input or primary shaft 8 driven by the drive engine through clutch 6 and a first output or secondary shaft 9 parallel to the input or primary shaft 8, the front front end of which, with respect to the forward direction, is connected in a rotationally restrained manner with a drive shaft 10 leading to a front axle or to a front axle differential of the motor vehicle, as it is schematically shown in FIG. 2. Furthermore, transmission 1 on the side of the drive engine is provided with a short second output shaft or tertiary shaft 11 which is driven by shaft 9 and the rear front end of which is connected in a rotationally restrained manner with a drive shaft 12 leading under the drive engine to a rear axle or to a rear axle differential of the motor vehicle, as it is schematically shown in FIG. 2. In order to let drive shaft 12 pass under the drive engine, on the one hand the first output shaft or secondary shaft 9 is arranged aslant under the input or primary shaft 8, as shown in FIG. 5. On the other hand, also the second output shaft or tertiary shaft 11 is arranged aslant under the first output shaft or secondary shaft 9.

As shown in the best way in FIGS. 2 and 3, the input or primary shaft 8 and the first output or secondary shaft 9 are each supported in three journal bearings, 13, 14, 15 or 16, 17, 18, respectively, of gearbox 2, of which two, 13, 15 or 17, 18, respectively, are arranged at the two opposite front ends of gearbox 2 and the third, 14 or 17, respectively, is arranged contiguous to the dividing plane 5, in the rear casing part 4 adjacent to the drive engine.

Transmission 1 is a synchronized transmission in which the input or primary shaft 8 carries eight driving gears 19, 20, 21, 22, 23, 24, 25, 26, each of them being in a permanent mesh with one of eight driven gears 27, 28, 29, 30, 31, 32, 33, 34 on the first output or secondary shaft 9. Gears 19, 20, 21, 22, 23, 24, 25, 26 and 27, 28, 29, 30, 31, 32, 33, 34 are each cylindrical cogwheels, which are provided in pairs with a straight or slanted complementary toothing. Each pair of gears 19, 27; 20, 28; 21, 29; 22, 30; 23, 31; 24, 32; 25, 33; 26, 34 on the input or primary shaft 8 and on the output or secondary shaft 9 is associated to one of the eight speeds of transmission 1. These eight speeds comprise seven forward speeds V1, V2, V3, V4, V5, V6, V7 and one reverse speed R, the arrangement of which along the two shafts 8, 9 is indicated in FIG. 2 above gears 19, 20, 21, 22, 23, 24, 25, 26. As shown in FIG. 2, speeds V1, V2, V3, V4, V5, V6, V7 and R, namely their pairs of gears 19, 27; 22, 30; 26, 34; 21, 29; 25, 33; 24, 32; 23, 31 and 20, 28 are arranged, starting from the front ends of shafts 8, 9 opposite to the drive engine, in the following sequence: first speed V1 with the two gears 19 and 27, reverse speed R with the two gears 20 and 28, fourth speed V4 with the two gears 21 and 29, second speed V2 with the two gears 22 and 30, seventh speed V7 with the two gears 23 and 31, sixth speed V6 with the two gears 24 and 32, fifth speed V5 with the two gears 25 and 33, as well as third speed V3 with the two gears 26 and 34.

All the gears 19, 20, 21, 22, 23, 24, 25, 26, and 27, 28, 29, 30, 31, 32, 33, 34 are applied in a non slidable manner on the relevant shaft 8 or 9, respectively. One of the two gears 19, 20, 21, 22, 31, 32, 33, 34 of each pair of gears 19, 27; 20, 28; 21, 29; 22, 30; 23, 31; 24, 32; 25, 33; 26, 34 is mounted in a rotationally restrained manner as a fixed gear on the relevant shaft 8 or 9, respectively, while the other of the two gears 27, 28, 29, 30, 23, 24, 25, 26 of the each pair of gears 19, 27; 20, 28; 21, 29; 22, 30; 23, 31; 24, 32; 25, 33; 26, 34 is inserted in a rotationally free manner as an idle gear on the relevant shaft 9 or 8, respectively, and can be coupled in a rotationally restrained manner with shaft 9 or 8, respectively.

Among the eight driving gears 19, 20, 21, 22, 23, 24, 25, 26 mounted on the input or primary shaft 8, four are constructed as fixed gears and four as idle gears. The fixed gears are gears 19, 20, 21, 22 of the first speed V1, the reverse speed R, the fourth speed V4 and the second speed V2, which are arranged in FIG. 2 from left to right one beside the other on the half of the input or primary shaft 8 opposite to the drive engine. The idle gears are gears 23, 24, 25, 26 of the seven speed V7, the sixth speed V6, the fifth speed V5 and the third speed V3, which are arranged in FIG. 2 from left to right one beside the other on the half of the input or primary shaft 8 adjacent to the drive engine.

Among the eight driven gears 27, 28, 29, 30, 31, 32, 33, 34 mounted on the output or secondary shaft 9, gears 27, 28, 29, 30 of the first speed V1, the reverse speed R, the fourth speed V4 and the second speed V2 are mounted from left to right in FIG. 2 as idle gears on the half of shaft 9 opposite to the drive engine, while gears 31, 32, 33, 45 of the seventh speed V7, the sixth speed V6, the fifth speed V5 and the third speed V3 are mounted as fixed gears on the half or shaft 9 adjacent to the drive engine.

Gear 34, constructed as a fixed gear, of the third speed V3 is in a permanent mesh with a further gear 35 which is mounted as a fixed gear in a rotationally restrained manner on the second output shaft or tertiary shaft 11 which does not carry any further gear other than gear 35. Thus, the fixed gear 34 on the output or secondary shaft 9 can perform at the same time two function since on the one hand it forms together with the idle gear 26 on the input or primary shaft the gear stage for the third speed V3 and on the other hand it forms together with the fixed gear 35 on the second output shaft or tertiary shaft 11 the gear stage for driving the drive shaft 12. With this arrangement, i.e. with the two fixed gears 34, 35 on shafts 9 and 11, the drive shafts 10 and 12 in all the seven forward speeds from V1 to V7 and in the reverse gear are driven together. Furthermore, with this arrangement a separate gear stage or at least one gear for driving the drive shaft 12 can be saved. In order to drive the two drive shafts 10 and 12 with the same number of revolutions, the two fixed gears 34 and 35 have the same diameter and the same number of teeth, so that a transmission ratio equal to 1 is provided between these gears 34 and 35.

The eight speeds V1, V2, V3, V4, V5, V6, V7 are R are combined in pairs into four shift groups S1, S2, S3, S4, wherein a first shift group S1 comprises the reverse speed R and the first speed V1, a second shift group S2 comprises the second speed V2 and the fourth speed V4, a third shift group S3 comprises the third speed V3 and the fifth speed V5, and a fourth shift group S4 comprises the sixth speed V6 and the seventh speed V7.

Speeds V1, R; V2, V4; V3, V5 and V6, V7 combined in pairs into a shift group S1, S2, S3, S4 are each shifted by means of a common shift device of the electro-hydraulic gear shift. The common shift device of each shift group S1, S2, S3, S4 comprises a shift sleeve 36 arranged between the adjacent idle gears of the two speeds V1, R; V2, V4; V3, V5 and V6, V7 and a shift bar 37 serving to control the shift sleeve 36. The shift sleeves 36 of the first and second shift groups S1 and S2 are arranged on the first output or secondary shaft 9 between the two idle gears 28, 27 of the reverse gear R and the first speed V1 and between the two idle gears 30, 29 of the second speed V2 and the fourth speed V4, respectively, while the shift sleeves 36 of the third and fourth shift group S3 and S4 are arranged on the input or primary shaft 8 between the two idle gears 26, 25 of the third speed V3 and the fifth speed V5 and between the two idle gears 24, 23 of the sixth speed V6 and the seventh speed V7, respectively, as shown in FIG. 2.

Figure 4:
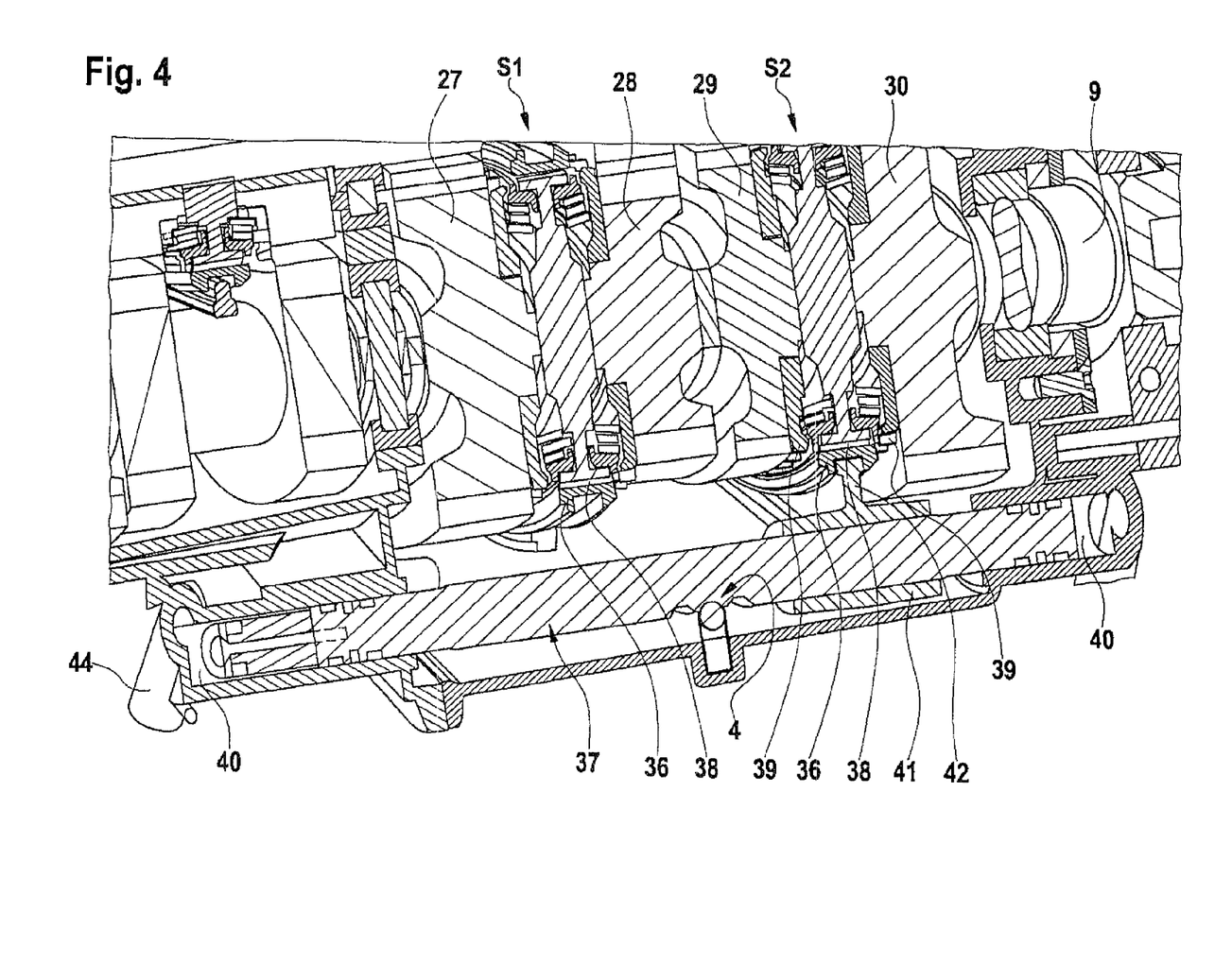
FIG. 4 shows an enlarged detailed view of a particular of FIG. 3.

As shown in the best way in FIG. 4, considering for example the shift group Si on the first output or secondary shaft 9, the shift sleeve 36 of each shift group is connected through a toothing 38 with shaft 9 so that the shift sleeve 36 with respect to shaft 9 is rotationally restrained and slidable in the axial direction. In a central rest position of the shift sleeve 36, neither idle gear 29, 30 of the two adjacent speeds V4 and V2 is coupled with shaft 9. In order to couple the idle gear 29, 30 of one of speeds V4, V2 in a rotationally restrained manner with shaft 9, the shift sleeve 36 is shifted toward the idle gear 29, 30 in one of the two opposite shift positions in which toothing 38 of the shift sleeve 36 engages with a complementary toothing 39 of the idle gear 29 or 30, respectively, and thus it connects the idle gear 29 or 30, respectively, in a rotationally restrained manner with shaft 9. When the shift sleeve 36 is shifted, a synchronizing device provides for the synchronization of the movement in synchrony between the shift sleeve 36 and the idle gear 29 or 30. The shift sleeves 36 close to the corresponding synchronizing device have a structure already known and therefore they do not need to be disclosed more in detail.

The shifting of each shift sleeve 36 is carried out with the aid of the relevant shift bar 37, one of which is shown in FIG. 4 and three are shown in FIG. 5. As shown in an exemplificative way in FIG. 4, the opposite front ends of each shift bar 37 are each guided in an axially slidable manner in a hydraulic cylinder 40 formed by the gearbox 2, so that the shift bar 37 by applying hydraulic oil to one of the hydraulic cylinders 40, oil which comes from the hydraulic group 7, can be shifted in opposite directions. A collar 41 having a protrusion 42 projecting toward the shift sleeve 36 and in engagement with the shift sleeve 36 so that the shift sleeve 36 is moved together with the shift bar 37 is fastened to the shift bar 37. In order to keep the shift sleeve 36 firm with respect to gearbox 2 in the rest position and in the two shift positions, gearbox 2 has a stop device 43 embodied as a spherical stop which is these positions engages with the shift bar 37.

The hydraulic cylinders 40 are connected with the hydraulic group 7 by means of hydraulic ducts 44, which hydraulic group is connected through signal lines (not shown) with a shift sectors guide of a gear shift lever or gearbox lever and which hydraulically converts electric shift signals received through the signal lines into corresponding movements of the shift bars 37.

As it can be seen from FIG. 2, with the exception of the fourth shift group S4 for the sixth and seventh speeds V6 and V7, two speeds V1, R; V2, V4; V3, V5 which do not follow each other in an immediate way but are instead separated by at least one speed are associated to each of the three remaining shift groups S1, S2 and S3. Thus, for example, in the upshift from the second speed V2 to the third speed V3, the shift bar 37 of the second shift group S2 serving for the disengagement of the second speed V2 can be moved simultaneously or in overlap with the engagement of the shift bar 37 of the third shift group S3 serving for the engagement of the third speed V3. This allows an almost uninterrupted shift of the drive force between the first speed V1 and the sixth speed V6, which means between speeds V1, V2, V3, V4, V5 and V6 in which a sporty drive is desired. On the other hand, this is no more necessary in the shift from the sixth speed V6 to the seventh speed V7, since the seventh speed V7 has to be rather considered a long overdrive. Thus, with only four shift groups S1, S2, S3 and S4 an ideal combination of sports transmission 1 with a long overdrive is obtained.

What is claimed is:

1. A 7-speed transmission for a motor vehicle, with seven forward speeds and a reverse speed, a primary shaft, a secondary shaft for driving a first drive shaft that leads to an axle differential, and a tertiary shaft for driving a second drive that leads to another axle differential, the secondary shaft carrying a fixed gear and the tertiary shaft carrying a fixed gear and the fixed gears of the secondary shaft and the tertiary shaft meshing with each other, with the fixed gear on the secondary shaft meshing with an idle gear which is coupled in a rotationally restrained manner on the primary shaft and directly drives in one of the forward speeds the fixed gear on the secondary shaft, wherein driving gears of the reverse speed, of a first one of the forward speeds, of a second one of the forward speeds and of a fourth one of the forward speeds are mounted in a rotationally restrained manner as fixed gears on the primary shaft, and driving gears of a third one of the forward speeds, of a fifth one of the forward speeds, of a sixth one of the forward speeds and of a seventh one of the forward speeds are mounted as idle gears on the primary shaft.

2. The 7-speed transmission of claim 1 for installation in a sports car.

3. The 7-speed transmission of claim 1, wherein the primary shaft is an input shaft, the secondary shaft is a first output shaft, and the tertiary shaft is a second output shaft.

4. The 7-speed transmission of claim 1, wherein the only gear carried by the tertiary shaft is the fixed gear.

5. The 7-speed transmission of claim 1, wherein the fixed gear on the secondary shaft and the fixed gear on the tertiary shaft have the same diameter and the same number of teeth.

6. The 7-speed transmission of claim 1, wherein in the third speed the idle gear on the primary shaft directly drives the fixed gear on the secondary shaft.

7. The 7-speed transmission of claim 1, wherein the primary shaft has a further idle gear and the idle gear on the primary shaft is combined into a shift group with the further idle gear on the primary shaft.

8. The 7-speed transmission of claim 7, wherein the secondary shaft has a further fixed gear and further idle gear meshes with the further fixed gear on the secondary shaft and directly drives the further fixed gear in another one of the forward speeds.

9. The 7-speed transmission of claim 1, wherein the tertiary shaft is arranged aslant under the secondary shaft, said secondary shaft being arranged aslant under the primary shaft.

10. The 7-speed transmission of claim 1, wherein each of the forward speeds and the reverse speed comprises a first driving gear arranged on the primary shaft and a second driving gear arranged on the secondary shaft.

11. The 7-speed transmission of claim 1, wherein the primary shaft and the secondary shaft are each supported in three journal bearings.

12. The 7-speed transmission of claim 11, wherein one of the journal bearings is a central journal bearing arranged close to a center of the primary shaft and of the secondary shaft and the other two of the journal bearings are arranged close to two opposite front ends of the primary shaft and of the secondary shaft.

13. The 7-speed transmission of claim 1, further comprising a gearbox comprising two casing parts arranged one behind the other in an axial direction.

14. The 7-speed transmission of claim 12, further comprising a gearbox comprising two casing parts arranged one behind the other in an axial direction, the central journal bearing of the primary shaft and of the, secondary shaft being arranged close to a dividing plane of the two casing parts.

15. The 7-speed transmission of claim 14, wherein one of the casing parts is placed adjacent to a drive engine, said central journal bearing being arranged in said one casing part.

16. The 7-speed transmission of claim 1, further comprising an electro-hydraulic shifting.

17. The 7-speed transmission of claim 1, further comprising four mobile shift bars slidable by hydraulic cylinders within a gearbox in parallel to axes of rotation of the primary, secondary and tertiary shafts.

18. The 7-speed transmission of claim 17, further comprising a hydraulic group located outside the gearbox and connected to the hydraulic cylinders through hydraulic ducts.

19. The 7-speed transmission of claim 1, wherein the seven forward speeds and the reverse speed are combined in pairs into four shift groups.

20. The 7-speed transmission of claim 19, wherein two of the four shift groups are arranged on the primary shaft and the other two of the four shift groups are arranged on the secondary shaft.

21. The 7-speed transmission of claim 1, wherein driven gears of the reverse speed, of the first forward speed, of the second forward speed and the fourth forward speed are mounted in a rotationally free manner as idle gears on the secondary shaft, and wherein driven gears of the third forward speed, the fifth forward speed, of the sixth forward speed and of the seventh forward speed are mounted as fixed gears on the secondary shaft.

22. A motor vehicle, comprising:
first and second axle differentials; and
a multi-speed transmission having seven forward speeds and a reverse speed, a primary shaft, a secondary shaft for driving a first drive shaft that leads to one of the first and second axle differentials, and a tertiary shaft for driving a second drive that leads to the other one of the first and second axle differentials, the secondary shaft carrying a fixed gear and the tertiary shaft carrying a fixed gear and the fixed gears of the secondary shaft and the tertiary shaft meshing with each other, with the fixed gear on the secondary shaft meshing with an idle gear which is coupled in a rotationally restrained manner on the primary shaft and directly drives in one of the forward speeds the fixed gear on the secondary shaft, wherein driving gears of the reverse speed, of a first one of the forward speeds, of a second one of the forward speeds and of a fourth one of the forward speeds are mounted in a rotationally restrained manner as fixed gears on the primary shaft, and driving gears of a third one of the forward speeds, of a fifth one of the forward speeds, of a sixth one of the forward speeds and of a seventh one of the forward speeds are mounted as idle gears on the primary shaft.

23. The motor vehicle of claim 22 constructed in the form of a sports car.

24. The motor vehicle of claim 22, wherein the primary shaft is an input shaft, the secondary shaft is a first output shaft, and the tertiary shaft is a second output shaft.

25. The motor vehicle of claim 22, wherein the only gear carried by the tertiary shaft is the fixed gear.

26. The motor vehicle of claim 22, wherein the fixed gear on the secondary shaft and the fixed gear on the tertiary shaft have the same diameter and the same number of teeth.

27. The motor vehicle of claim 22, wherein in the third forward speed the idle gear on the primary shaft directly drives the fixed gear on the secondary shaft.

28. The motor vehicle of claim 22, wherein the primary shaft has a further idle gear and the idle gear on the primary shaft is combined into a shift group with the further idle gear on the primary shaft.

29. The motor vehicle of claim 28, wherein the secondary shaft has a further fixed gear and the further idle gear meshes with the further fixed gear on the secondary shaft and directly drives the further fixed gear in another one of the forward speeds.

30. The motor vehicle of claim 22, wherein the tertiary shaft is arranged aslant under the secondary shaft, said secondary shaft being arranged aslant under the primary shaft.

31. The motor vehicle of claim 22, wherein each of the forward speeds and the reverse speed comprises a first driving gear arranged on the primary shaft and a second driving gear arranged on the secondary shaft.

32. The motor vehicle of claim 22, wherein the primary shaft and the secondary shaft are each supported in three journal bearings.

33. The motor vehicle of claim 32, wherein one of the journal bearings is a central journal bearing arranged close to a center of the primary shaft and of the secondary shaft and the other two of the journal bearings are arranged close to two opposite front ends of the primary shaft and of the secondary shaft.

34. The motor vehicle of claim 22, wherein the multi-speed transmission includes a gearbox comprising two casing parts arranged one behind the other in an axial direction.

35. The motor vehicle of claim 22, wherein the multi-speed transmission includes a gearbox comprising two casing parts arranged one behind the other in an axial direction, the central journal bearing of the primary shaft and of the secondary shaft being arranged close to a dividing plane of the two casing parts.

36. The motor vehicle of claim 35, wherein one of the casing parts is placed adjacent to a drive engine, said central journal bearing being arranged in said one casing part.

37. The motor vehicle of claim 22, wherein the multi-speed transmission includes an electro-hydraulic shifting.

38. The motor vehicle of claim 22, wherein the multi-speed transmission includes four mobile shift bars slidable by hydraulic cylinders within a gearbox in parallel to axes of rotation of the primary, secondary and tertiary shafts.

39. The motor vehicle of claim 38, wherein the multi-speed transmission includes a hydraulic group located outside the gearbox and connected to the hydraulic cylinders through hydraulic ducts.

40. The motor vehicle of claim 22, wherein the seven forward speeds and the reverse speed are combined in pairs into four shift groups.

41. The motor vehicle of claim 40, wherein two of the four shift groups are arranged on the primary shaft and the other two of the four shift groups are arranged on the secondary shaft.

42. The motor vehicle of claim 22, wherein driven gears of the reverse speed, of the first forward speed, of the second forward speed and the fourth forward speed are mounted in a rotationally free manner as idle gears on the secondary shaft, and wherein driven gears of the third forward speed, the fifth forward speed, of the sixth forward speed and of the seventh forward speed are mounted as fixed gears on the secondary shaft.

43. The motor vehicle of claim 22, wherein the one of the first and second axle differentials is a front axle differential, and the other one of the first and second axle differentials is a rear axle differential.

44. The motor vehicle of claim 43, further comprising a drive engine, said rear axle differential being placed under the drive engine.

* * * * *